(12) United States Patent
Hochi

(10) Patent No.: US 7,687,572 B2
(45) Date of Patent: Mar. 30, 2010

(54) RUBBER COMPOSITION

(75) Inventor: Kazuo Hochi, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 22 days.

(21) Appl. No.: 12/003,357

(22) Filed: Dec. 21, 2007

(65) Prior Publication Data

US 2008/0194760 A1    Aug. 14, 2008

(30) Foreign Application Priority Data

Feb. 9, 2007    (JP)    ............... 2007-030968

(51) Int. Cl.
C08J 3/00    (2006.01)
C08L 55/00    (2006.01)

(52) U.S. Cl. ...................... 524/579; 524/566

(58) Field of Classification Search ................ 524/579
See application file for complete search history.

(56) References Cited

U.S. PATENT DOCUMENTS 6,225,397 B1 *  5/2001  Materne et al. ............. 524/493
2008/0188613 A1 *  8/2008  Tanaka et al. ................ 524/566

FOREIGN PATENT DOCUMENTS

| | | |
|---|---|---|
| DE | 100 15 308 A1 | 10/2001 |
| EP | 0 915 132 A1 | 5/1999 |
| EP | 1 882 716 A1 | 1/2008 |
| JP | 2001-158836 A | 6/2001 |
| JP | 2003-192842 A | 7/2003 |
| JP | 2005-171034 A | 6/2005 |
| JP | 2006-070194 A | 3/2006 |

OTHER PUBLICATIONS

STIC search results.*
Ishikawa et al., "Stress-Optical of *cis*-1,4-Polybutadiene and *cis*-1,4-Polyisoprene Networks. Measurements on *cis*-1,4-Polybutadiene Networks and Theoretical Interpretation", Journal of Polymer Science: Part A-2, 1969, vol. 7, pp. 1123-1150, Government Industrial Research Institute, Osaka, Japan.
Falbe et al., "ROMPP CHEMIE LEXIKON", 1992, 9. Auflage, 3 pgs., Georg Thieme Verlag Stuttgart, New York.

* cited by examiner

*Primary Examiner*—Ling-Siu Choi
*Assistant Examiner*—Hui Chin
(74) *Attorney, Agent, or Firm*—Birch, Stewart, Kolasch and Birch, LLP

(57) ABSTRACT

The present invention provides a rubber composition having more improved low heat build-up property and abrasion resistance, especially a rubber composition useful for the rubber composition used for a tread of tire, and the present invention also provides a tire having a tread prepared using the rubber composition. The rubber composition is one comprising 15 to 150 parts by weight of silica on the basis of 100 parts by weight of a rubber component, wherein the rubber component comprises not less than 10% by weight of a butadiene rubber which has a vinyl content of not more than 35% by weight and is modified with an un-substituted aminosilane compound.

16 Claims, No Drawings

RUBBER COMPOSITION

BACKGROUND OF THE INVENTION

The present invention relates to a rubber composition which is suitably used for a tread of tire and has low heat build-up property and excellent abrasion resistance.

Reduction of fuel consumption of a car has been progressed by decreasing rolling resistance of a tire which is one of characteristics required for a car.

Recently demand for low fuel consumption of a car has been increasing, and not only improvement in rolling resistance but also improvement in performance for inhibiting heat build-up of a tire (low heat build-up property) has been studied. Low heat build-up property is strongly required for a tread occupying a large weight ratio in tire members, and reduction of heat-build-up of a rubber composition for a tread is demanded.

One of methods for enhancing low heat build-up property is a method of decreasing an amount of a reinforcing filler. However in the case of this method, since hardness of the rubber composition is decreased, a tire is softened, thereby causing a problem that handling performance (steering stability) and wet skid performance are lowered and abrasion resistance is lowered.

In addition, another method of improving low heat build-up property, abrasion resistance and wet grip (skid) performance in good balance by combination use of dry silica and wet silica as silica for reinforcement in a rubber composition is proposed (JP2003-192842A).

However further improvement in low heat build-up property is demanded.

SUMMARY OF THE INVENTION

An object of the present invention is to provide a rubber composition having more improved rolling resistance and abrasion resistance especially a rubber composition useful for a tread of tire, and further to provide a tire having a tread prepared using the rubber composition.

The present invention relates to a rubber composition comprising 15 to 150 parts by weight of silica on the basis of 100 parts by weight of a rubber component, where the rubber component is one comprising not less than 10% by weight of a butadiene rubber having a vinyl content of not more than 35% by weight and modified with an aminosilane compound represented by the following formula (I):

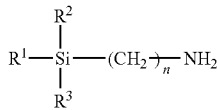

wherein $R^1$, $R^2$ and $R^3$ are the same or different, and each is an alkyl group, an alkoxy group, a silyloxy group, an acetal group, a carboxyl group, a mercapto group, and residues thereof; n is an integer of 1 to 8.

It is preferable that $R^1$, $R^2$ and $R^3$ in the aminosilane compound of the formula (I) are all alkoxy groups, from the viewpoint of satisfactory dispersibility of silica.

It is preferable that the silica is one comprising not less than 5 parts by weight of silica (1) having an average primary particle diameter of less than 22 nm based on 100 parts by weight of the rubber component, from the viewpoint of satisfactory abrasion resistance.

It is preferable that the silica is a mixture further comprising not less than 10 parts by weight of silica (2) having an average primary particle diameter of not less than 22 nm based on 100 parts by weight of the rubber component, and the average primary particle diameter of the silica (1) and the average primary particle diameter of the silica (2) satisfy the following equation:

(average primary particle diameter of the silica (2))/
(average primary particle diameter of the silica
(1))≧1.4, from the viewpoint of satisfactory balance of low heat build-up property and abrasion resistance.

It is preferable that an amount of the silica (1) and an amount of the silica (2) satisfy the following equation:

(amount of the silica (2))×0.03≦(amount of the silica
(1))≦(amount of the silica (2))×14, from the viewpoint of satisfactory balance of rubber processability, abrasion resistance and grip performance.

The present invention also relates to a tire having a tread prepared by using the rubber composition.

DETAILED DESCRIPTION

The rubber composition of the present invention comprises a specific rubber component and silica.

Said rubber component is characterized by comprising a specified amount of a specific butadiene rubber modified with an aminosilane compound represented by the formula (I).

Such a specific butadiene rubber is one satisfying the following requirements:

(1) the butadiene rubber is modified with an aminosilane compound, (2) the butadiene rubber has a vinyl content of not more than 35% by weight, and (3) the butadiene rubber is contained in an amount of not less than 10% by weight in the rubber component.

In the aminosilane compound (I) for the modification, $R^1$, $R^2$ and $R^3$ are the same or different, and it is preferable that all of them are R— or RO— (R is a monovalent hydrocarbon group having 1 to 18 carbon atoms).

Examples of the monovalent hydrocarbon group R are alkyl groups having 1 to 18 carbon atoms, alkenyl groups having 2 to 8 carbon atoms, aryl groups having 6 to 18 carbon atoms and aralkyl groups having 7 to 18 carbon atoms.

Alkyl groups and alkenyl groups may be in any of linear, branched and cyclic forms, and examples thereof are a methyl group, an ethyl group, a n-propyl group, an isopropyl group, a n-butyl group, an isobutyl group, a sec-butyl group, a tert-butyl group, a pentyl group, a hexyl group, an octyl group, a decyl group, a dodecyl group, a cyclopentyl group, a cyclohexyl group, a vinyl group, a propenyl group, an allyl group, a hexenyl group, an octenyl group, a cyclopentenyl group and a cyclohexenyl group.

Aryl groups may have a substituent group such as a lower alkyl group on its aromatic ring, and examples thereof are a phenyl group, a tolyl group, a xylyl group and a naphthyl group.

Aralkyl groups also may have a substituent group such as a lower alkyl group on its aromatic ring, and examples thereof are a benzyl group, a phenethyl group and naphthylmethyl group.

$R^1$, $R^2$ and $R^3$ are the same or different, and it is preferable that all of them are the same, from the viewpoint of easy synthesis, availability and low fuel consumption. It is preferable that all of $R^1$, $R^2$ and $R^3$ are ethoxy.

The number of ethylene groups which is represented by n is 1 to 8, and from the viewpoint of low fuel consumption, it is 1 to 5.

Nonlimiting examples of the aminosilane compound represented by the formula (I) are aminomethyltrimethoxysilane, aminomethyltriethoxysilane, 2-aminoethyltrimethoxysilane, 2-aminoethyltriethoxysilane, 3-aminopropyltrimethoxysilane and 3-aminopropyltriethoxysilane. Among these, 3-aminopropyltriethoxysilane is preferable from the viewpoint of low fuel consumption.

The modification of the butadiene rubber with the aminosilane compound can be carried out by, for example, a known method of bringing the aminosilane compound into contact with the butadiene rubber having alkali metal at its end at a temperature of room temperature to 100° C. In this case, the modification occurs at an end of the butadiene rubber.

It is preferable that a proportion of the modified butadiene rubber modified with the aminosilane compound is 10 to 80% by weight in the whole butadiene rubber molecules, from the viewpoint of low fuel consumption and satisfactory rubber processability.

The vinyl content of the butadiene rubber modified with the aminosilane compound which is used in the present invention is not more than 35% by weight. If the vinyl content exceeds 35% by weight, low heat build-up property is lowered. Preferable vinyl content is not more than 25% by weight, further preferably not more than 20% by weight. A lower limit thereof is not limited particularly but is not zero and is 5% by weight, preferably 8% by weight from the viewpoint of low temperature characteristics.

A weight average molecular weight of a butadiene rubber to be modified is 300,000 to 2,000,000, further 500,000 to 1,500,000 from the viewpoint of satisfactory balance of low fuel consumption and rubber processability. Also the vinyl content is preferably not more than 35% by weight.

The vinyl content of the butadiene rubber can be measured under the conditions for determining a proton signal of a vinyl group with a solution NMR available from BRUCKER BIOSPIN.

Such an aminosilane-modified butadiene rubber occupies not less than 10% by weight in the rubber component. When its content is less than 10% by weight, an effect of reducing heat build-up is insufficient and an object of the present invention cannot be achieved. A preferable content is not less than 15% by weight in the rubber component. The rubber component may be one comprising the butadiene rubber alone. From the viewpoint of increasing strength of the rubber, other kind of rubber may be used together. When other kind of rubber is used together, an upper limit is preferably 90% by weight, further preferably 80% by weight.

Examples of other kind of rubber are natural rubber (NR), synthetic polyisoprene rubber (IR), butadiene rubber (BR) other than the above-mentioned modified butadiene rubber, styrene-butadiene rubber (SBR), acrylonitrile-butadiene rubber (NBR), chloroprene rubber (CR), butyl rubber (IIR) and styrene-isoprene-butadiene copolymer rubber (SIBR). These rubber components may be used alone or two or more kinds thereof may be used in combination. From the viewpoint of low heat build-up property and wet skid performance, it is desirable to use natural rubber (NR) and/or isoprene rubber (IR).

Silica, which is other component of the rubber composition of the present invention, is not specifically limited, and may be silica prepared through a dry process and silica prepared through a wet process. The silica prepared through a wet process is preferable since rubber strength and grip performance are excellent due to a large number of silanol groups.

An amount of silica is not less than 15 parts by weight, preferably not less than 40 parts by weight, more preferably not less than 60 parts by weight based on 100 parts by weight of the rubber component. In the case where the amount of silica is less than 15 parts by weight, a reinforcing effect obtained by the addition of silica is insufficient. A preferable upper limit of the amount of silica is 150 parts by weight, further 120 parts by weight based on 100 parts by weight of the rubber component. In the case where the amount of silica is too large, it becomes difficult to disperse silica evenly in the rubber component, resulting in deterioration of processability of the rubber composition.

It is preferable that the silica (1) having the average primary particle diameter of less than 22 nm and the silica (2) having the average primary particle diameter of not less than 22 nm are used together. By using the silica (2) together with the silica (1), low heat build-up property and processability of a rubber are improved more.

When using the silica (1) and the silica (2) together, an amount of the silica (1) is not less than 5 parts by weight, preferably not less than 10 parts by weight based on 100 parts by weight of the rubber component from the viewpoint of improving strength of the rubber composition. A preferable upper limit of the amount of the silica (1) is 140 parts by weight, more preferably 80 parts by weight based on 100 parts by weight of the rubber component from the viewpoint of maintaining excellent processability of a rubber and not deteriorating abrasion resistance. The amount of the silica (2) is a residual amount of the silica (1).

In view of further improving rolling resistance of a tire having a tread prepared using the rubber composition, a content of the silica (1) in the whole silica is preferably not less than 10% by weight, more preferably not less than 15% by weight. An upper limit of the content of the silica (1) in the whole silica is preferably 35% by weight, more preferably 30% by weight from the viewpoint of maintaining rupture strength.

From the viewpoint of keeping steering stability of a tire having a tread prepared using the rubber composition and maintaining low rolling resistance, it is preferable that the amounts of the silica (1) and the silica (2) in the whole silica satisfy the following equation:

(amount of the silica (2))×0.03≦(amount of the silica (1))≦(amount of the silica (2))×14.

The amount of the silica (1) is more preferably not less than 0.15 times that of the silica (2), especially not less than 0.25 times that of the silica (2). In the case where the amount of the silica (1) is less than 0.03 times that of the silica (2), steering stability of a tire having a tread prepared using the rubber composition tends to be decreased. The amount of the silica (1) is preferably not more than 7 times that of the silica (2), especially preferably not more than 4 times that of the silica (2). In the case where the amount of the silica (1) is more than 14 times that of the silica (2), rolling resistance of a tire having a tread prepared using the rubber composition tends to increase.

In the case where the silica (1) and the silica (2) are used together, it is preferable that a particle diameter ratio of the silica (1) and the silica (2) satisfy the following equation (1):

(average primary particle diameter of the silica (2)/ (average primary particle diameter of the silica (1))≧1.4 from the viewpoint of effects obtained by blending two kinds of silica, for example, low heat build-up property, satisfactory processability of a rubber, and excellent abrasion resistance. A more preferable particle diameter ratio is 2.0 or more. An upper limit thereof is not limited particularly, and is preferably 5, more preferably 4 from the viewpoint of satisfactory rupture strength.

In the present invention, the average primary particle diameter of silica means a diameter obtained by approximating minimum particle units of agglomerated silica to a circle and averaging the diameters thereof.

The average primary particle diameter of silica can be obtained by observing diameters of 100 primary particles with a transmission electron microscope available from Hitachi, Ltd. and determining an average value of diameters of 100 primary particles. The rubber composition of the present invention preferably comprises a silane coupling agent.

Nonlimiting examples of the silane coupling agent are, for instance, sulfide silane coupling agents such as bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, bis(3-triethoxysilylpropyl)trisulfide, bis(3-trimethoxysilylpropyl)trisulfide, bis(3-triethoxysilylpropyl)disulfide, bis(3-trimethoxysilylpropyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoletetrasulfide, 3-triethoxysilylpropylmethacrylatemonosulfide, and 3-trimethoxysilylpropylmethacrylatemonosulfide; mercapto silane coupling agents such as 3-mercaptopropyltrimethoxysilane, 3-mercaptopropyltriethoxysilane, 2-mercaptoethyltrimethoxysilane, and 2-mercaptoethyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro silane coupling agents such as 3-nitropropyltrimethoxysilane and 3-nitropropyltriethoxysilane; and chlorosilane coupling agents such as 3-chloropropyltrimethoxysilane, 3-chloropropyltriethoxysilane, 2-chloroethyltrimethoxysilane, and 2-chloroethyltriethoxysilane. These silane coupling agents may be used alone or at least 2 kinds thereof may be used in combination.

From the viewpoint of improving rupture strength of the rubber composition and decreasing rolling resistance of the tire having a tread prepared using the rubber composition, an amount of the silane coupling agent is preferably not less than 5 parts by weight, more preferably not less than 8 parts by weight based on of 100 parts by weight of the amount of the silica (the total amount of the silica (1) and the silica (2) when the both are used together). In the case where the amount of the silane coupling agent is less than 5 parts by weight, rupture strength tends to be decreased. An upper limit of the amount of the silane coupling agent is 15 parts by weight, further 10 parts by weight. In the case where the amount of the silane coupling agent is more than 15 parts by weight, there is a tendency that effects of blending the silane coupling agent tend to be deteriorated.

To the rubber composition of the present invention, compounding agents which are generally used for preparation of a rubber composition, in particular the rubber composition used for a tread of tire, may be added to an extent not to impair the effects of the present invention. Such compounding agents are, for example, reinforcing fillers such as a carbon black and clay, a vulcanizing agent such as sulfur, a vulcanization accelerator, an antioxidant, zinc oxide, stearic acid, aromatic oil, and wax.

For preparing the rubber composition of the present invention, known preparation methods can be employed. For example, each of the above-mentioned components can be kneaded with a rubber kneading equipment such as an open roll or a banbury mixer.

The rubber composition of the present invention is suitable for a tire, especially for a tire tread, and when used for a tread, a tire having low heat build-up property and excellent abrasion resistance can be obtained, which can improve fuel consumption of a car.

EXAMPLE

Hereinafter, the present invention will be explained in detail based on Examples, but it should be understood that the present invention is not limited thereto.

Various chemicals used in Examples and Comparative Examples will be collectively explained below.

Styrene-butadiene rubber (SBR): E15 available from Asahi Kasei Corporation

BR (1): Butadiene rubber modified with an aminosilane compound in which $R^1$, $R^2$ and $R^3$ are ethoxy, and n is 3 in the formula (I) (trial manufacture; amount of modified butadiene rubber: 30% by weight in the whole butadiene, vinyl content: 15% by weight) (modifying conditions are explained below)

BR (2): Nipol BR1220 available from ZEON CORPORATION (unmodified, vinyl content: 15% by weight)

BR (3): Butadiene rubber modified with 3-dimethylaminopropyltriethoxysilane (trial manufacture; amount of modified butadiene rubber: 32% by weight in the whole butadiene, vinyl content: 14% by weight) (modifying conditions are explained below)

BR (4): Butadiene rubber modified with an aminosilane compound in which $R^1$, $R^2$ and $R^3$ are methoxy, and n is 3 in the formula (I) (trial manufacture; amount of modified butadiene rubber: 31% by weight in the whole butadiene, vinyl content: 15% by weight) (modifying conditions are explained below)

Carbon black: SEAST NH available from Tokai Carbon Co., Ltd.

Silica (1): ULTRASIL VN3 (average primary particle diameter: 15 nm) available from Degussa GmbH Silica (2-1): ULTRASIL 360 (average primary particle diameter: 28 nm) available from Degussa GmbH Silica (2-2): Nipsil E-743 (average primary particle diameter: 43 nm) available from TOSOH SILICA CORPORATION Silane coupling agent: Si75 (bis(3-triethoxysilylpropyl)disulfide) available from Degussa-Huls AG.

Zinc oxide: Zinc oxide No. 1 available from Mitsui Mining & Smelting Co., Ltd.

Stearic acid: Stearic acid "TSUBAKI" available from NOF Corporation.

Aromatic oil: Process X-140 available from Japan Energy Corporation

Antioxidant: Antigene 6C (N-(1,3-dimethylbutyl)-N'-phenyl-p-phenylenediamine) available from Sumitomo Chemical Co., Ltd.

Wax: SANNOC N available from Ouchi Shinko Chemical Industrial Co., Ltd.

Sulfur: Powder sulfur available from Karuizawa Iou Kabushiki Kaisha

Vulcanization accelerator (1): NOCCELER CZ (N-cyclohexyl-2-benzothiazolylsulfenamide) available from Ouchi Shinko Chemical Industrial Co., Ltd.

Vulcanization accelerator (2): NOCCELER D (N,N'-diphenylguanidine) available from Ouchi Shinko Chemical Industrial Co., Ltd.

(Preparation of BR (1))

Into a 10 liter autoclave were poured 6 liter of cyclohexane, 55 ml of diethyl ether, 570 g of 1,3-butadiene, and 2.6 ml of 1.6M n-butyl lithium solution as a polymerization initiator under nitrogen atmosphere, followed by 4-hour reaction at 50° C. to prepare a butadiene rubber. Then thereto was added 1.4 ml of 1M cyclohexane solution of aminosilane compound in which $R^1$, $R^2$ and $R^3$ are ethoxy, and n is 3 in the formula (I), followed by further reaction for one hour to modify the butadiene rubber. Thereafter 10 g of 2,6-di-t-butyl-p-cresol was added as an antioxidant and drying was carried out to obtain a modified BR (1).

Also a vinyl content of the obtained modified butadiene rubber was measured under the conditions for determining a proton signal of a vinyl group with a solution NMR available from BRUCKER BIOSPIN.

An amount of the obtained modified butadiene rubber was 30% by weight in the whole butadiene rubber, and its vinyl content was 15% by weight.

(Preparation of BR (3))

Butadiene rubber was modified in the same manner as in the above-mentioned Preparation of BR (1) except that the rubber was modified with 3-dimethylaminopropyltriethoxysilane.

A vinyl content of the obtained modified butadiene rubber was measured in the same manner as in the above-mentioned Preparation of BR (1)

An amount of the obtained modified butadiene rubber was 32% by weight in the whole butadiene rubber, and its vinyl content was 14% by weight.

(Preparation of BR (4))

Butadiene rubber was modified in the same manner as in the above-mentioned Preparation of BR (1) except that the rubber was modified with an aminosilane compound in which $R^1$, $R^2$ and $R^3$ are methoxy, and n is 3 in the formula (I).

A vinyl content of the obtained modified butadiene rubber was measured in the same manner as in the above-mentioned Preparation of BR (1)

An amount of the obtained modified butadiene rubber was 31% by weight in the whole butadiene rubber, and its vinyl content was 15% by weight.

Examples 1 to 9

According to the compounding prescriptions shown in Table 1, components other than sulfur and a vulcanization accelerator were kneaded for four minutes, using a Banbury mixer. Then, sulfur and a vulcanization accelerator were added thereto and kneaded for four minutes, using an open roll, to obtain an unvulcanized rubber composition. Further, the obtained unvulcanized rubber composition was press-vulcanized for 12 minutes at 170° C. and a vulcanized sheet was prepared.

The obtained vulcanized rubber sheet was subjected to viscoelasticity test and abrasion resistance test. The results are shown in Tables 1 and 2.

(Viscoelasticity Test)

The vulcanized rubber sheet is subjected to oxidation by heating at 170° C. for 12 minutes to obtain an oxidized test rubber sheet. Using a viscoelasticity spectrometer manufactured by Iwamoto Seisakusho Kabushiki Kaisha, a loss tangent (tan δ) of the test rubber sheet is measured at 30° C. under the conditions of a frequency of 10 Hz, an initial strain of 10%, and a dynamic strain of 2%. Assuming that tan δ of Comparative Example 1 is 100, a loss tangent tan δ measured in other Examples and Comparative Examples are substituted in the following equation to evaluate viscoelasticity by the obtained index (low heat build-up property index). The larger the value of the heat build-up property index is, the smaller the amount of heat generation is and the more favorable the low heat build-up property is.

(Low heat build-up property index)=(tan δ of Comparative Example 1)/(tan δ of each of Examples)×100

(Abrasion Resistance Test)

Using a Lambourn abrasion tester, a Lambourn abrasion amount of each of the test rubber sheets is measured under the conditions of a temperature of 20° C., a slip ratio of 20% and a test time of 2 minutes. Then, a volume loss is calculated from the obtained Lambourn abrasion amount, and assuming that a volume loss of Comparative Example 1 is 100, a volume loss calculated in each of Examples and Comparative Examples is substituted in the following equation to evaluate abrasion resistance by the obtained index (Lambourn abrasion index). The larger the Lambourn abrasion index is, the superior the abrasion resistance is (small abrasion amount).

(Lambourn abrasion index)=(Volume loss of Comparative Example 1)/(Volume loss of each of Examples)×100

Comparative Examples 1 to 3

An unvulcanized rubber composition was prepared in the same manner as in Example 1 except that the compounding prescriptions for Comparative Examples shown in Table 1 were used, and press-vulcanization was carried out in the same manner as in Example 1, to prepare a vulcanized rubber sheet for comparison. Viscoelasticity test and abrasion resistance test of the obtained vulcanized rubber sheet for comparison were carried out in the same manner as in Example 1. The results are shown in Table 2.

TABLE 1

|  | Ex. | | | | | | Com. Ex. | | |
|---|---|---|---|---|---|---|---|---|---|
|  | 1 | 2 | 3 | 4 | 5 | 6 | 1 | 2 | 3 |
| Rubber composition (part by weight) | | | | | | | | | |
| Rubber component | | | | | | | | | |
| SBR | 85 | 85 | 85 | 85 | 85 | 85 | 85 | 85 | 85 |
| BR (1) | 15 | 15 | 15 | 15 | 15 | 15 | — | — | — |
| BR (2) | — | — | — | — | — | — | 15 | 15 | — |
| BR (3) | — | — | — | — | — | — | — | — | 15 |

TABLE 1-continued

|  | Ex. | | | | | | Com. Ex. | | |
| --- | --- | --- | --- | --- | --- | --- | --- | --- | --- |
|  | 1 | 2 | 3 | 4 | 5 | 6 | 1 | 2 | 3 |
| Silica | | | | | | | | | |
| Silica (1) | 60 | 40 | 40 | 50 | 60 | 15 | 60 | 8 | 60 |
| Silica (2-1) | — | 20 | — | 20 | 15 | 60 | — | — | — |
| Silica (2-2) | — | — | 20 | — | — | — | — | — | — |
| Particle diameter ratio (Silica (2)/(1)) | — | 1.5 | 2.9 | 1.5 | 1.5 | 1.5 | — | — | — |
| Weight ratio (Silica (1)/(2)) | — | 2.0 | 2.0 | 2.5 | 4.0 | 0.25 | — | — | — |
| Silane coupling agent | 0.6 | 0.6 | 0.6 | 0.7 | 0.6 | 0.6 | 0.6 | 0.08 | 0.6 |
| Carbon black | 10 | 10 | 10 | 10 | 10 | 10 | 10 | 40 | 10 |
| Zinc oxide | 3 | 3 | 3 | 3 | 3 | 3 | 3 | 3 | 3 |
| Stearic acid | 2 | 2 | 2 | 2 | 2 | 2 | 2 | 2 | 2 |
| Antioxidant | 2 | 2 | 2 | 2 | 2 | 2 | 2 | 2 | 2 |
| Wax | 2 | 2 | 2 | 2 | 2 | 2 | 2 | 2 | 2 |
| Aromatic oil | 20 | 20 | 20 | 20 | 20 | 20 | 20 | 20 | 20 |
| Sulfur | 1.8 | 1.8 | 1.8 | 1.8 | 1.8 | 1.8 | 1.8 | 1.6 | 1.8 |
| Vulcanization accelerator (1) | 1.2 | 1.2 | 1.2 | 1.2 | 1.2 | 1.2 | 1.2 | 1 | 1.2 |
| Vulcanization accelerator (2) | 0.6 | 0.6 | 0.6 | 0.6 | 0.6 | 0.6 | 0.6 | — | 0.6 |
| Results of evaluation | | | | | | | | | |
| Low heat build-up property index | 104 | 105 | 106 | 105 | 102 | 107 | 100 | 96 | 101 |
| Lambourn abrasion index | 109 | 106 | 102 | 109 | 106 | 101 | 100 | 104 | 101 |

TABLE 2

|  | Ex. | | | |
| --- | --- | --- | --- | --- |
|  | 1 | 7 | 8 | 9 |
| Rubber composition (part by weight) | | | | |
| Rubber component | | | | |
| SBR | 85 | 50 | 20 | 85 |
| BR (1) | 15 | 50 | 80 | — |
| BR (4) | — | — | — | 15 |
| Silica | | | | |
| Silica (1) | 60 | 60 | 60 | 60 |
| Silane coupling agent | 0.6 | 0.6 | 0.6 | 0.6 |
| Carbon black | 10 | 10 | 10 | 10 |
| Zinc oxide | 3 | 3 | 3 | 3 |
| Stearic acid | 2 | 2 | 2 | 2 |
| Antioxidant | 2 | 2 | 2 | 2 |
| Wax | 2 | 2 | 2 | 2 |
| Aromatic oil | 20 | 20 | 20 | 20 |
| Sulfur | 1.8 | 1.8 | 1.8 | 1.8 |
| Vulcanization accelerator (1) | 1.2 | 1.2 | 1.2 | 1.2 |
| Vulcanization accelerator (2) | 0.6 | 0.6 | 0.6 | 0.6 |
| Results of evaluation | | | | |
| Low heat build-up property index | 104 | 111 | 123 | 105 |
| Lambourn abrasion index | 109 | 109 | 101 | 108 |

According to the present invention, there can be provided a rubber composition having more improved low heat build-up property and abrasion resistance, especially a rubber composition useful for the rubber composition used for a tread of tire, and the present invention can also provide a tire having a tread prepared using the rubber composition.

What is claimed is:

1. A rubber composition comprising 15 to 150 parts by weight of silica on the basis of 100 parts by weight of a rubber component,
said rubber component comprising
not less than 10% by weight of a butadiene rubber having a vinyl content of 15 to 35% by weight and being modified with an aminosilane compound represented by the following formula (I):

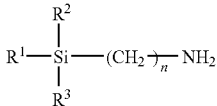

wherein $R^1$, $R^2$ and $R^3$ are the same or different, and each is an alkyl group, an alkoxy group, a silyloxy group, an acetal group, a carboxyl group, a mercapto group, or residues thereof; n is an integer of 1 to 8.

2. The rubber composition of claim 1, wherein $R^1$, $R^2$ and $R^3$ in said aminosilane compound of the general formula (I) are all alkoxy groups.

3. The rubber composition of claim 1 comprising not less than 5 parts by weight of a silica (1) having an average primary particle diameter of less than 22 nm based on 100 parts by weight of the rubber component.

4. The rubber composition of claim 2 comprising not less than 5 parts by weight of a silica (1) having an average primary particle diameter of less than 22 nm based on 100 parts by weight of the rubber component.

5. The rubber composition of claim 3 wherein said silica is a mixture further comprising not less than 10 parts by weight of a silica (2) having an average primary particle diameter of not less than 22 nm based on 100 parts by weight of the rubber component, and the average primary particle diameter of the silica (1) and the average primary particle diameter of the silica (2) satisfy the following equation:

(average primary particle diameter of the silica (2))/(average primary particle diameter of the silica (1))≧1.4.

6. The rubber composition of claim 4 wherein said silica is a mixture further comprising not less than 10 parts by weight of a silica (2) having an average primary particle diameter of not less than 22 nm based on 100 parts by weight of the rubber component, and the average primary particle diameter of the silica (1) and the average primary particle diameter of the silica (2) satisfy the following equation:

(average primary particle diameter of the silica (2))/(average primary particle diameter of the silica (1))≧1.4.

7. The rubber composition of claim 5, wherein an amount of the silica (1) and an amount of the silica (2) in the whole silica satisfy the following equation:

(amount of the silica (2))×0.03≦(amount of the silica (1))≦(amount of the silica (2))×14.

8. The rubber composition of claim 6, wherein an amount of the silica (1) and an amount of the silica (2) in the whole silica satisfy the following equation:

(amount of the silica (2))×0.03≦(amount of the silica (1))≦(amount of the silica (2))×14.

9. A tire having a tread prepared by using the rubber composition of claim 1.

10. A tire having a tread prepared by using the rubber composition of claim 2.

11. A tire having a tread prepared by using the rubber composition of claim 3.

12. A tire having a tread prepared by using the rubber composition of claim 4.

13. A tire having a tread prepared by using the rubber composition of claim 5.

14. A tire having a tread prepared by using the rubber composition of claim 6.

15. A tire having a tread prepared by using the rubber composition of claim 7.

16. A tire having a tread prepared by using the rubber composition of claim 8.

* * * * *